United States Patent [19]

Kalvenes et al.

[11] 4,329,178

[45] May 11, 1982

[54] METHOD IN THE MANUFACTURE OF STEAM-CURED LIGHT-WEIGHT AERATED CONCRETE WITH HYDROPHOBIC PROPERTIES

[75] Inventors: Øystein Kalvenes, Bjärred; Carl-Henry Krill, Malmö; Percy Svensson, Sandby; Knut Helmersson, Malmö, all of Sweden

[73] Assignee: Internationella Siporex Aktiebolag, Malmo, Sweden

[21] Appl. No.: 118,689

[22] Filed: Feb. 5, 1980

[30] Foreign Application Priority Data

Feb. 15, 1979 [SE] Sweden .............................. 7901373
Oct. 1, 1979 [SE] Sweden .............................. 7908118

[51] Int. Cl.³ ............................................. C04B 7/00
[52] U.S. Cl. .......................................... 106/87; 106/90; 106/119; 106/120
[58] Field of Search .................... 106/87, 90, 119, 120

[56] References Cited

U.S. PATENT DOCUMENTS 2,880,101 3/1959 Ulfstedt ................................ 106/87
2,898,220 8/1959 Ulfstedt et al. ....................... 106/87
3,318,839 5/1967 Weissbach ........................... 106/90
3,623,895 11/1971 Nitzsche et al. .................... 106/119

*Primary Examiner*—James Poer
*Attorney, Agent, or Firm*—Fred Philpitt

[57] ABSTRACT

A method in the manufacture of steam-cured light-weight aerated concrete having hydrophobic properties, comprising preparing an aqueous expandable and solidifiable slurry, one or more hydraulic binders and one or more silica-containing materials casting the slurry in a mould; expanding and solidifying, and optionally cutting the solidified slurry; and steam-curing the resultant light-weight aerated concrete, wherein prior to casting said slurry it is admixed with silicone oil in a quantity of 0.05–0.50%, calculated on the dry weight of the starting mixture.

26 Claims, No Drawings

METHOD IN THE MANUFACTURE OF STEAM-CURED LIGHT-WEIGHT AERATED CONCRETE WITH HYDROPHOBIC PROPERTIES

The present invention relates to a method in the manufacture of steam-cured light-weight aerated concrete having hydrophobic properties, comprising preparing an aqueous expandable and solidifiable slurry from one or more hydraulic binders and one or more silica-containing materials, casting the slurry in a mould; expanding and solidifying, and optionally cutting the solidified slurry; and steam-curing the resultant light-weight aerated concrete.

Such methods are known to the art (see German Offenlegungsschrift No. 1 646 979). Through such methods it is known to impart to the resultant light-weight aerated concrete, hydrophobic properties, by impregnating the concrete product with a hydrophobic agent in conjunction with the steam-curing process, an aqueous emulsion or a solution of an alkali-resistant organo-silicone-compound being introduced into the curing chamber and converted to the steam phase. The patent specification proposes, in a casual manner, that sodium methyl-siliconate or potassium methyl-siliconate, or a solution of a silicone resin dissolved in an organic solvent, is added to the starting materials, i.e. the expandable and solidifiable slurry of hydraulic binder and silica-containing material. The patent specification also discloses, as an equivalent possibility, that silicone powder or a silicone emulsion is admixed with the starting material and states further, that the hydrophobic effect is less manifest with additions in small amounts, while larger amounts affect the mechanical strength of the finished steam-cured aerated concrete in a most unfavourable manner.

It has now been found that the different silicone-organic compounds have a very varying effect. Thus, whilst sodium-methyl-siliconate and potassium-methyl-siliconate and silicone powder give a relatively poor combination of effects, it has now been surprisingly found that silicone oils when added in extremely small quantities to a starting material mixture for steam-cured light-weight aerated concrete in accordance with the above, affords an extremely advantageous combination of hydrophobic properties and the retention of, or in a number of cases an improved mechanical strength. One criterion for the use of silicone oil in obtaining the specific combination of advantages is that the amount added shall be held within a range of 0,05–0,50%, calculated on the weight of the dry starting mixture.

It must be considered very surprising that silicone oils easily endure the prevailing, extreme conditions with respect to high temperatures and the strongly alkaline conditions when steam-curing, whereby it is possible to select the contents within a range which includes very small quantities, which are substantially unaffected during the steam-curing process.

According to the invention, it has now also been found that the amount of silicone oil added can be reduced and/or a better distribution of the silicone oil throughout the entire light-weight aerated concrete mass be obtained with the aforegiven quantity, if the slurry of starting material from which the light-weight aerated concrete is made is also admixed, in addition to the silicone oil, with one or more surfactants taken from group of anionic and nonionic agents. It has been found that this effect is especially obtained with dimethylsiloxane oil, but can also be obtained with other siloxane polymers, in which ethyl and phenyl groups are bound to the silicone atoms of the siloxane polymer to the same degree or in a varying degree.

Silicone oils are liquid-like products based on polymers of the type

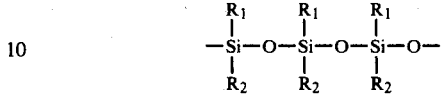

in which $R_1$ and $R_2$ each stand for methyl, ethyl or phenyl, $R_1$ and $R_2$ being each preferably methyl. $R_1$ may be methyl and $R_2$ ethyl or phenyl. Thus, the silicone oil used is normally dimethylsiloxane oil. Such oils are found available with viscosities which can vary over a wide range, from 0.65 to 100.000 centistokes, and provide good water-repelling effects with respect to steam-cured light-weight aerated concrete, when the amount added is adjusted to suitable values.

According to an embodiment of the invention the silicone oil can be added as an emulsion thereof, preferably in water.

According to the invention, the effect of the silicone oil is normally sufficient for practical purposes when it is added in a quantity of 0.10–0.25%, calculated on the dry weight of the starting mixture.

As examples of anionic substances, mentioning can be especially made to soap, soft-soap; sulphonated fats, oils and fatty acids; alkylaryl sulphonates; fatty alcohol sulphonates; alkyl sulphonates; sulphonated and sulphurated amides; sulphonated and sulphurated esters, amines, polyethers etc.; sulphonated and sulphurated esters, e.g. monoglycerides, amines, polyethers etc. Substances of the kind retailed under the trade name "Teepol ®" (sodium salt of higher secondary alkyl sulphates originating from petroleum) have been found particularly suitable for use for the aforegiven purposes. A soap-like compound which has also proved effective is a mixture consisting of fatty acids, especially oleic acid, and amines, such as diethanolamine or triethanolamine. Suitable additive quantites of the surfactant or surfactants can be readily found empirically by those skilled in the art, and normally reach to at least 0.0005%, calculated on the dry weight of the starting mixture.

It is previously known that different kinds of oils can be added to the slurry of starting material from which light-weight aerated concrete is to be made in order to stabilize the expanding porous mixture. The effect of the stabilizers is to increase the surface tension at the cell walls. In this way, the cell walls are ensured a certain rigidity or stiffness as soon as the binder begins to harden. In the majority of cases the stabilizers have the form of hydrocarbon oils added with a surfactant, which renders them emulsifiable in water.

It has now been found that such oils when added as stabilizers, have a special effect when added together with silicone oils to the starting mixture for lightweight aerated concrete. When the oil is added with a surfactant as an emulsifier, the product which is colloidally soluble in water will have a dispersing effect on the silicone oil, thereby increasing the effect of said oil or permitting the quantity added to be reduced within the given range.

Suitable additive quantities of oil and surfactant dissolved therein or undissolved surfactant lie between 0.01 and 0.70% calculated on the dry weight of the starting mixture.

In accordance with one embodiment of the invention, hydrocarbon oil admixed with one or more surfactants, can be added to a minor quantity of water to form an emulsion prior to being incorporated in the slurry of starting material. Optionally, the silicone oil can also be incorporated with the emulsion prior to said emulsion being added to the slurry.

Although the invention is applicable to light-weight aerated concrete having a wide range of density, i.e. 150 to 800 kg per m$^3$, it has proved especially valuable in respect of manufacturing steamcured light-weight aerated concrete having low densities in the range of from 150 to 450 kg per m$^3$. Such products have become of increased interest due to their good heat-insulating properties. However, they present a greater waterabsorbing ability than products having higher densities. The invention now provides lighter light-weight aerated concrete products having improved strength, low shrinkage, minor or no salt efflorescence and improved heat insulating properties, conbined with low waterabsorbing ability.

The invention will now be illustrated with a number of examples, Example 1 being intended to illustrate the prior art and remaining examples the technical progress attained by the invention.

EXAMPLE 1

For the purpose of producing steam-cured light-weight aerated concrete, an aqueous moulding composition was prepared from the following constituents:

| Sand | 50 kg |
|---|---|
| Portland cement | 28 kg |
| Lime | 12 kg |
| Waste slurry | 8 kg |
| Aluminium powder + regulator | 2 kg. |

55 liters of water were added to the resultant mixture, which weighed 100 kg. The slurry thus obtained was used as a moulding composition.

The sand contained quartz with a silica content of 70-80%. The lime used was a finely-ground unslaked lime having a calcium oxide content of 88-92%. The cement was of the normal Portland cement type. The aluminium powder had a thin-flaked structure having a content of free aluminium reaching to 90-95%.

The mixture was produced in the following manner. The quartz-containing sand was wet ground in a ball mill to form a comparatively readily flowable slurry with an extremely high degree of finess. The sand slurry was then mixed carefully with accurately determined quantities of cement, lime, waste slurry and additional water to form a mass of suitable consistency. Subsequent to being steam-hardened in an autoclave for 12 hours at 10 atmospheres a product having the following properties was obtained:

| Compression strength kp/cm$^2$ | 38.5 |
|---|---|
| Density, kg/m$^3$ | 470 |
| Shrinkage, 0/00 | 0.33 |
| Salt efflorescence: | quite high |

| Water absorption liters per square meter | | |
|---|---|---|
| After | 24 hours | 14.4 |
|  | 48 hours | 17.3 |
|  | 72 hours | 18.1 |

EXAMPLE 2

A light-weight aerated concrete was manufactured in a manner similar to that described in Example 1, there being added to the slurry from which the casting mass is obtained 0.22% dimethyl-siloxane oil having a viscosity of 1000 centistokes, said percentage being calculated on the dry weight of the starting mixture.

The cast and steam-cured light-weight aerated concrete had the following test values:

| Compression strength, kp/cm$^2$ | 43.8 |
|---|---|
| Density, kg/m$^3$ | 470 |
| Shrinkage, 0/00 | 0.23 |
| Efflorescence: | none |

| Water absorption liters per square meter | | |
|---|---|---|
| After | 24 hours | 1.4 |
|  | 48 hours | 1.9 |
|  | 72 hours | 2.3 |

EXAMPLE 3

A crude mixture for light-weight aerated concrete was prepared in a manner similar to that described in Example 1, there being added to the slurry from which the cast mass is formed 0.04% dimethyl-siloxane oil having a viscosity of 1000 centistokes, said percentage being calculated on the dry starting mixture.

The cast and steam-cured light-weight aerated concrete had the following properties.

| Compression strength, kp/cm$^2$ | 41.9 |
|---|---|
| Density, kg/m$^3$ | 470 |
| Shrinkage, 0/00 | 0.27 |
| Efflorescence: | none |

| Water absorption liters per square meter | | |
|---|---|---|
| After | 24 hours | 6.1 |
|  | 48 hpurs | 8.3 |
|  | 72 hours | 10.2 |

EXAMPLE 4

A light-weight aerated concrete mass was manufactured in a manner similar to that described in Example 1, there being added to the slurry from which the cast mass is formed 0.08% dimethyl-siloxane oil having a viscosity of 1000 centistokes, calculated on the dry weight of the starting mixture.

The steam-cured light-weight aerated concrete product had the following properties.

| Compression strength, kp/cm$^2$ | 40.3 |
|---|---|
| Density, kg/m$^3$ | 470 |
| Shrinkage, 0/00 | 0.29 |

-continued

| Salt efflorescence | none |
|---|---|

| Water absorption liters per square meter | | |
|---|---|---|
| After | 24 hours | 2.6 |
| | 48 hours | 4.2 |
| | 72 hours | 5.1 |

EXAMPLE 5

Light-weight aerated concrete was manufactured in a manner similar to that described in Example 1, there being added to the slurry 0.3% of dimethyl siloxane oil having a viscosity of 1000 centistokes, calculated on the dry weight of the starting mixture, and a soap, sodium salt of a mixture of higher saturated and unsaturated fatty acids, in a quantity of 0.25%, calculated on the dry weight of the starting substance. After being cast and autoclaved, the concrete had the following properties:

| Compression strength kp/cm$^2$ | 39.2 |
|---|---|
| Density, kg/m$^3$ | 470 |
| Shrinkage, 0/00 | not defined |
| Salt efflorescence | none |

| Water absorption liters per square meter | | |
|---|---|---|
| After | 24 hours | 1.4 |
| | 48 hours | 1.7 |
| | 72 hours | 2.3 |

EXAMPLE 6

Light-weight aerated concrete was manufactured in a manner similar to that described in Example 1, there being added to the slurry 0.5% of dimethylsiloxane oil having a viscosity of 1000 centistokes, calculated on the dry weight of the starting mixture, and a surfactant substance Teepol ®, anionic wetting agents, sodium salts of higher secondary alkyl sulphates originating from petroleum, in a quantity of 0.001%, calculated on the dry weight of the starting mixture.

The cast and steam-cured light-weight aerated concrete had the following properties:

| Compression strength, kp/cm$^2$ | 40.3 |
|---|---|
| Density, kg/m$^3$ | 470 |
| Shrinkage, 0/00 | 0.29 |
| Salt efflorescence | none |

| Water absorption liters per square meter | | |
|---|---|---|
| After | 24 hours | 1.3 |
| | 48 hours | 1.7 |
| | 72 hours | 2.0 |

EXAMPLE 7

A crude mixture for light-weight aerated concrete was prepared in a manner similar to that described in Example 1, there being added to the slurry 0.08% dimethyl-siloxane oil having a viscosity of 1000 centistokes, calculated on the dry weight of the starting mixture, and a surfactant (Teepol ®) in a quantity of 0.001%, calculated on the dry weight of the starting mixture.

The cast and steam-cured light-weight aerated concrete had the following properties.

| Compression strength, kp/cm$^2$ | 40.8 |
|---|---|
| Density, kg/m$^3$ | 470 |
| Shrinkage, 0/00 | 0.31 |
| Salt efflorescence | none |

| Water absorption liters per square meter | | |
|---|---|---|
| After | 24 hours | 1.3 |
| | 48 hours | 1.9 |
| | 72 hours | 2.2 |

EXAMPLE 8

A light-weight aerated concrete mass having the composition used in Example 1 was admixed with 0.5% dimethylsiloxane oil having a viscosity of 1000 centistokes, calculated on the dry weight of the starting mixture. A water-soluble hydrocarbon oil, mineral oil with emulsifier, (sold by Nynäs Petroleum AB) was added to the casting mass in a quantity of 0.3%, calculated on the dry weight of the starting mixture.

The steam-cured light-weight aerated concrete product had the following properties:

| Compression strength, kp/cm$^2$ | 38.9 |
|---|---|
| Density, kg/m$^3$ | 470 |
| Shrinkage, 0/00 | not defined |
| Salt efflorescence | none |

| Water absorption liters per square meter | | |
|---|---|---|
| After | 24 hours | 1.4 |
| | 48 hours | 1.9 |
| | 72 hours | 2.4 |

EXAMPLE 9

For the purpose of manufacturing autoclaved light-weight aerated concrete, there was prepared a water-containing casting mass of the following composition:

| Sand | 60 kg |
|---|---|
| Lime | 21 kg |
| Portland cement | 12 kg |
| Waste slurry | 5 kg |
| Aluminium powder + regulator | 2 kg |

53 liters of water were added to the mixture, which weighed 100 kg.

The sand contained quartz having a silica content of 70–80%. The lime used comprised finely-ground unslaked lime having a calcium oxide content of 88–92%. The cement was of the normal Portland-cement type. The aluminium powder had a thin-flake structure with a content of free aluminium reaching to 90–95%. The powder was thermally degreased.

The concrete was manufactured in the following manner. The quartz-containing sand was wet ground in a ball mill to a comparatively readily flowable sludge having a very high degree of finess. The sand sludge was then carefully mixed with accurately determined quantities of cement, lime, waste slurry and additional water to form a mass of suitable consistency.

The slurry was admixed with 0.2% dimethylsiloxane oil having a viscosity of 1000 centistokes, calculated on the dry weight of the starting mixture, and a surfactant (Teepol ®) in a quantity of 0.001%, calculated on the dry weight of the starting substance.

Subsequent to steam—curing the mass in an autoclave for 12 hours at 10 atmospheres, a product having the following properties was obtained:

| | |
|---|---|
| Compression strength, kp/cm$^2$ | 40.7 |
| Density, kg/m$^3$ | 470 |
| Shrinkage, 0/00 | 0.31 |
| Salt efflorescence | none |

| Water absorption liters per square meter | | |
|---|---|---|
| After | 24 hours | 1.6 |
| | 48 hours | 2.4 |
| | 72 hours | 3.2 |

EXAMPLE 10

For the purpose of manufacturing steam-cured light-weight aerated concrete, there was prepared a water-containing mass from the following constituents:

| | |
|---|---|
| Sand | 50 kg |
| Portland-cement | 20 kg |
| Granulated basic blast-furnace slag | 24 kg |
| Waste slurry | 4 kg |
| Aluminium powder + regulator | 2 kg |

58 liters of water were added to the mixture thus obtained, which weighed 100 kg.

The sand contained quartz having a silica content of 70-80%. The slag was a granulated basic blast-furnished slag having 40-45% calcium oxide and 35-40% silica. The cement used was a normal Portland-cement type. The aluminium powder had a thinflake structure with a content of free aluminium reaching to 90-95%. The aluminium was thermally degreased.

Manufacture was effected in the following manner. The sand and slag were wet ground in a ball mill to form a comparatively readily flowable sludge having a very high degree of finess.

The sludge obtained by the grinding operation was then carefully mixed with accurately determined quantities of cement, waste slurry and additional water to form a mass having a suitable consistency for casting or moulding purposes.

The sludge was then mixed with 0.2% dimethylsiloxane oil having a viscosity of 1000 centistokes calculated on the dry weight of the starting mixture, and a surfactant (Teepol ®) in a quantity of 0.001%, calculated on the dry weight of the starting mixture.

Subsequent to being autoclaved for 12 hours at 10 atmospheres, a product having the following properties was obtained:

| | |
|---|---|
| Compression strength, kg/cm$^2$ | 37.7 |
| Density, kg/cm$^2$ | 470 |

| | |
|---|---|
| Shrinkage, 0/00 | 0.37 |
| Salt efflorescence | none |

| Water absorption liters per square meter | | |
|---|---|---|
| After | 24 hours | 1.4 |
| | 48 hours | 2.1 |
| | 72 hours | 2.9 |

EXEMPLE 11

A crude mixture for light-weight aerated concrete was prepared in a manner similar to that described in Example 1, there being added to the slurry from which the cast mass is formed 0.3% dimethylsiloxane oil having a viscosity of 1000 centistokes, said percentage being calculated on the dry starting mixture, and a mixture of oleic acid and triethanolamine (molar ratio 1:3) in an amount of 0.01 percent, calculated on the dry starting mixture.

The cast and steam-cured light-weight aerated concrete had the following properties:

| | |
|---|---|
| Compression strength, kp/cm$^2$ | 38.9 |
| Density, kg/m$^3$ | 470 |
| Shrinkage, 0/00 | 0.28 |
| Efflorescence | none |

| Water absorption liters per square meter | | |
|---|---|---|
| After | 24 hours | 1.3 |
| | 48 hours | 1.8 |
| | 72 hours | 2.2 |

EXAMPLE 12

For the purpose of manufacturing autoclave light-weight aerated concrete, there was prepared a water-containing casting mass of the following composition:

| | |
|---|---|
| Sand | 45 kg |
| Lime | 12 kg |
| Portland cement | 35 kg |
| Waste slurry | 6 kg |
| Aluminium powder + regulator | 2 kg |

65 liters of water were added to the mixture, which weighed 100 kg, together with 0.3 percent of dimethylsiloxane oil having a viscosity of 1000 centistokes, calculated on the weight of the dry starting mixture, and a surface-active agent (Teepol ®) in an amount of 0.001 percent, calculated on the dry starting mixture.

The sand contained quartz having a silica content of 70-80%. The lime used comprised finely-ground unslaked lime having a calcium oxide content of 88-92%. The cement was of the normal Portland-cement type. The aluminium powder had a thin-flake structure with a content of free aluminium reaching to 90-95%.

The concrete was manufactured in the following manner. The quartz-containing sand was wet ground in a ball mill to a comparatively readily flowable sludge having a very high degree of finess. The sand sludge was then carefully mixed with accurately determined quantities of cement, lime, waste slurry and additional water to form a mass of suitable consistency.

Subsequent to steam-curing the mass in an autoclave for 12 hours at 10 atmospheres, a product having the following properties was obtained:

| Compression strength, kp/cm$^2$ | 25.3 |
|---|---|
| Density, kg/m$^3$ | 280 |
| Shrinkage, 0/00 | 0.27 |
| Salt efflorescence | none |

| Water absorption liters per square meter | | |
|---|---|---|
| After | 24 hours | 1.5 |
| | 48 hours | 2.1 |
| | 72 hours | 2.8 |

By comparison tests made between the products of examples 2, 3, 4 and examples 5, 6, 7, 8, 9, 10, 11, 12, which relate to methods according to the invention, and example 1, which relates to a method according to the present state of the art, it was found that when practising the method of the invention the siloxane oil has very good distribution in the casting mass within a large quantity range when a surfactant is added.

The steam-cured light-weight aerated concrete exhibited a homogenous water-repelling product within all parts thereof, without any negative influence on the material properties of the concrete.

What is claimed is:

1. A method in the manufacture of steam-cured light-weight aerated concrete having hydrophobic properties, comprising preparing an aqueous expandable and solidifiable slurry comprising one or more hydraulic binders and one or more silica-containing materials, casting the slurry in a mould; expanding and solidifying, and optionally cutting the solidified slurry; and steam-curing the resultant lightweight aerated concrete, wherein prior to casting said slurry it is admixed with silicone oil in a quantity of 0.05–0.50%, calculated on the dry weight of the starting mixture.

2. A method according to claim 1, wherein the silicone oil is added in the form of an emulsion thereof in water.

3. A method according to claim 1, wherein the silicone oil is added in a quantity of 0.05–0.30%, calculated on the dry weight of the starting mixture.

4. A method according to claim 3, wherein the silicone oil is added in an amount of 0.10–0.25%, calculated on the dry weight of the starting mixture.

5. A method according to claim 1, wherein the silicone oil is dimethylsiloxane oil.

6. A method according to claim 1, wherein the silicone oil is methylethylsiloxane oil.

7. A method according to claim 1, wherein the silicone oil is methylphenylsiloxane oil.

8. A method according to claim 1, wherein, prior to the casting operation, a hydrocarbon oil is added to the slurry as a stabilizer.

9. A method according to claim 8, wherein at least one surfactant is dissolved in the oil.

10. A method according to claim 9, wherein the mixture of hydrocarbon oil and the surfactant or surfactants is added with water to form an emulsion which is added to the slurry prior to the casting operation.

11. A method in the manufacture of steam-cured light-weight aerated concrete having hydrophobic properties, comprising preparing an aqueous expandable and solidifiable slurry comprising one or more hydraulic binders and one or more silica-containing materials, casting the slurry in a mould; expanding and solidifying, and optionally cutting the solidified slurry; and steam-curing the resultant light-weight aerated concrete, wherein prior to casting said slurry it is admixed with silicone oil in a quantity of 0.05–0.50%, calculated on the dry weight of the starting mixture, and with one or more anion-active and/or nonion-active substances.

12. A method according to claim 11, wherein the silicone oil is added in the form of an emulsion thereof in water.

13. A method according to claim 11, wherein the silicone oil is added in a quantity of 0.05–0.30%, calculated on the dry weight of the starting mixture.

14. A method according to claim 11, wherein the silicone oil is added in an amount of 0.10–0.25%, calculated on the dry weight of the starting mixture.

15. A method according to claim 11, wherein the silicone oil is dimethylsiloxane oil.

16. A method according to claim 11, wherein the steam-cured light-weight aerated concrete is rendered a density in the range of from 150 to 450 kg per m$^3$.

17. A method in the manufacture of steam-cured light-weight aerated concrete having hydrophobic properties, comprising preparing an aqueous expandable and solidifiable slurry comprising one or more hydraulic binders and one or more silica-containing materials, casting the slurry in a mould; expanding and solidifying, and optionally cutting the solidified slurry; and steam-curing the resultant lightweight aerated concrete, wherein prior to casting said slurry it is admixed with silicone oil in a quantity of 0.05–0.50%, calculated on the dry weight of the starting mixture and wherein the steam-cured light-weight aerated concrete is rendered a density in the range of from 150 to 450 kg per m$^3$.

18. A method according to claim 17, wherein the silicone oil is added in the form of an emulsion thereof in water.

19. A method according to claim 17, wherein the silicone oil is added in a quantity of 0.05–0.30%, calculated on the dry weight of the starting mixture.

20. A method according to claim 17, wherein the silicone oil is added in an amount of 0.10–0.25%, calculated on the dry weight of the starting mixture.

21. A method according to claim 17, wherein the silicone oil is dimethylsiloxane oil.

22. A method according to claim 17, wherein the silicone oil is methylethylsiloxane oil.

23. A method according to claim 17, wherein the silicone oil is methylphenylsiloxane oil.

24. A method according to claim 17, wherein, prior to the casting operation, a hydrocarbon oil is added to the slurry as a stabilizer.

25. A method according to claim 17, wherein a surfactant or surfactants is or are dissolved in the oil.

26. A method according to claim 17, wherein a mixture of hydrocarbon oil and a surfactant or surfactants is added with water to form an emulsion which is added to the slurry prior to the casting operation.

* * * * *